(12) United States Patent
Thompson et al.

(10) Patent No.: US 9,816,873 B2
(45) Date of Patent: Nov. 14, 2017

(54) CONTAINER TEMPERATURE MONITORING SYSTEM

(71) Applicants: James F. Thompson, Sacramento, CA (US); Frederic R. Weeth, Pacific Grove, CA (US)

(72) Inventors: James F. Thompson, Sacramento, CA (US); Frederic R. Weeth, Pacific Grove, CA (US)

( * ) Notice: Subject to any disclaimer, the term of this patent is extended or adjusted under 35 U.S.C. 154(b) by 357 days.

(21) Appl. No.: 14/516,916

(22) Filed: Oct. 17, 2014

(65) Prior Publication Data

US 2016/0109301 A1   Apr. 21, 2016

(51) Int. Cl.
| | | |
|---|---|---|
| G01K 13/02 | (2006.01) | |
| G01K 7/02 | (2006.01) | |
| G01K 1/14 | (2006.01) | |
| G01K 1/16 | (2006.01) | |

(52) U.S. Cl.
CPC .............. G01K 7/02 (2013.01); G01K 1/146 (2013.01); G01K 1/16 (2013.01); G01K 13/02 (2013.01); G01K 13/022 (2013.01); *G01K 2013/024* (2013.01); *G01K 2207/04* (2013.01)

(58) Field of Classification Search
CPC ............................ G01K 13/10; G01K 13/002
USPC ........................................................ 374/135
See application file for complete search history.

(56) References Cited

U.S. PATENT DOCUMENTS

| | | | | |
|---|---|---|---|---|
| 2,915,898 A | * | 12/1959 | Van Luik, Jr. | G01N 25/64 73/29.02 |
| 3,199,353 A | * | 8/1965 | Burnight | G01K 13/10 374/155 |
| 3,886,797 A | | 6/1975 | Bauer | |
| 3,940,988 A | * | 3/1976 | Reed | G01K 13/02 136/231 |
| 5,211,476 A | | 5/1993 | Coudroy | |
| 6,014,890 A | * | 1/2000 | Breen | G01N 25/64 600/529 |
| 6,046,674 A | | 4/2000 | Irwin et al. | |
| 6,185,513 B1 | | 2/2001 | Plettner et al. | |
| 6,222,371 B1 | | 4/2001 | Snyder | |
| 6,300,871 B1 | | 10/2001 | Irwin et al. | |
| 6,536,189 B1 | | 3/2003 | Murray | |
| 6,712,507 B2 | * | 3/2004 | Park | G01K 1/16 338/28 |
| 6,865,516 B1 | | 3/2005 | Richardson | |
| 6,937,148 B2 | | 8/2005 | Irwin | |
| 7,004,625 B2 | | 2/2006 | Egidio | |
| 7,056,012 B2 | | 6/2006 | Blakeley, III | |
| 7,097,351 B2 | | 8/2006 | Lancon et al. | |
| 7,111,981 B2 | | 9/2006 | Blakeley, III | |
| 7,163,336 B2 | | 1/2007 | Blakeley, III | |
| 7,168,316 B2 | | 1/2007 | Blakeley, III | |

(Continued)

*Primary Examiner* — Minh Phan
*Assistant Examiner* — Leon W Rhodes, Jr.
(74) *Attorney, Agent, or Firm* — Vierra Magen Marcus LLP

(57) ABSTRACT

A system is disclosed for measuring a temperature of air within a container or other enclosure containing temperature controlled items or other product. The system includes a temperature sensor having a thermocouple within a shaft, and a fan for drawing air from within the container through the shaft and past a junction of the thermocouple. The temperature sensor further includes a control unit for correlating a voltage from the thermocouple to a temperature.

18 Claims, 7 Drawing Sheets

(56) References Cited

U.S. PATENT DOCUMENTS

| | | |
|---|---|---|
| 7,392,150 B2 | 6/2008 | Kuepper et al. |
| 7,561,982 B2 | 7/2009 | Rund et al. |
| 7,604,398 B1 | 10/2009 | Akers et al. |
| 7,711,515 B2 | 5/2010 | Burdett et al. |
| 8,230,005 B2 | 7/2012 | McKay et al. |
| 8,271,197 B2 | 9/2012 | Fogarty et al. |
| 8,992,081 B2* | 3/2015 | Ireland .................. G01K 13/02 374/144 |
| 2002/0161545 A1 | 10/2002 | Starling et al. |
| 2002/0163436 A1 | 11/2002 | Singh et al. |
| 2004/0227636 A1* | 11/2004 | Gul ......................... G01K 1/08 340/620 |
| 2007/0200722 A1 | 8/2007 | Piety et al. |
| 2008/0120188 A1 | 5/2008 | Mobley et al. |
| 2008/0212643 A1 | 9/2008 | McGahhey et al. |
| 2008/0259993 A1 | 10/2008 | Blakeley |
| 2009/0096617 A1 | 4/2009 | Purcell et al. |
| 2010/0121159 A1 | 5/2010 | Burnett et al. |
| 2010/0314443 A1 | 12/2010 | Cudzilo |
| 2012/0069867 A1 | 3/2012 | Wijffels |
| 2012/0079981 A1 | 4/2012 | Huffman et al. |
| 2014/0102175 A1* | 4/2014 | Wasden ................. G01K 13/02 73/29.02 |

\* cited by examiner

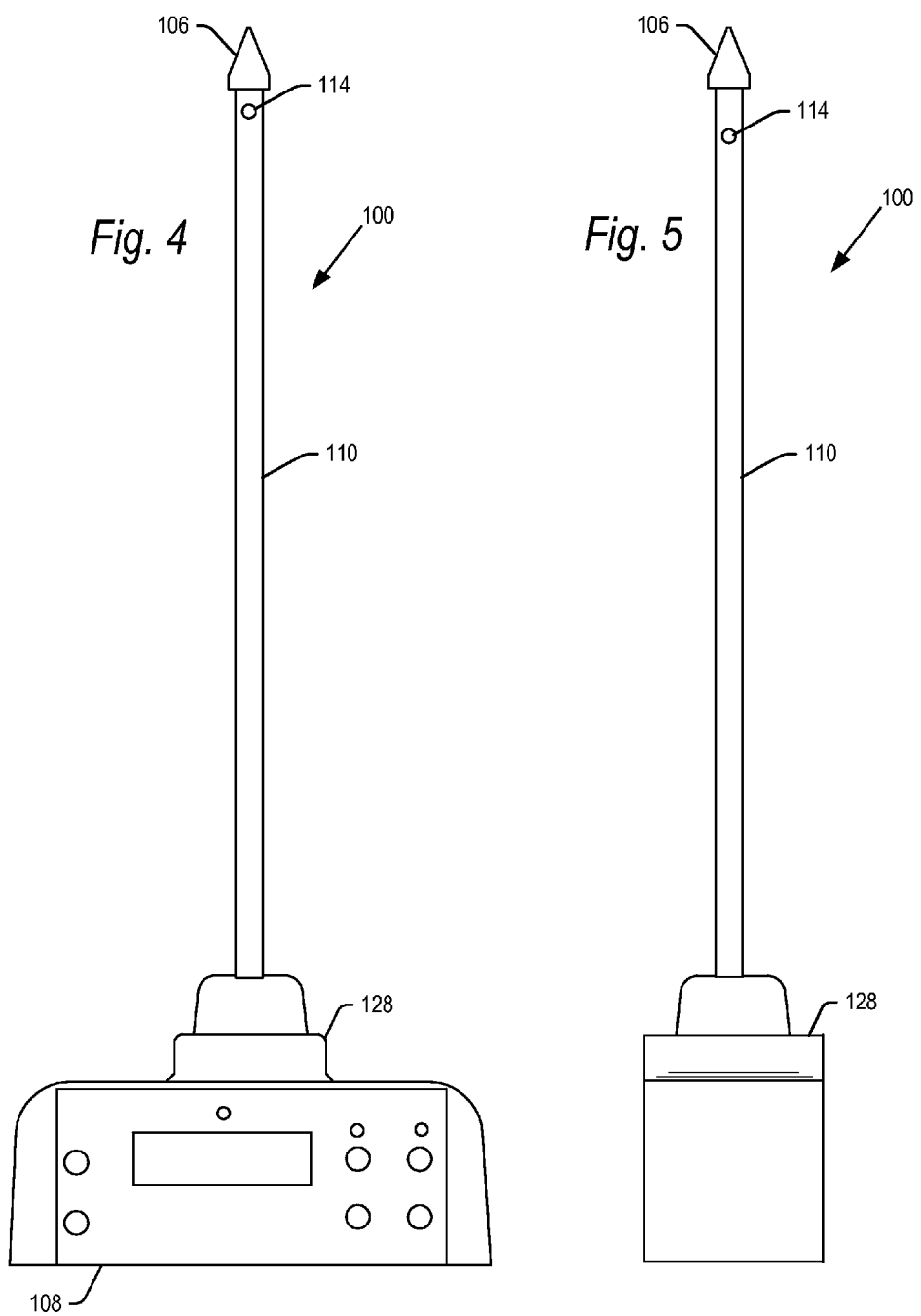

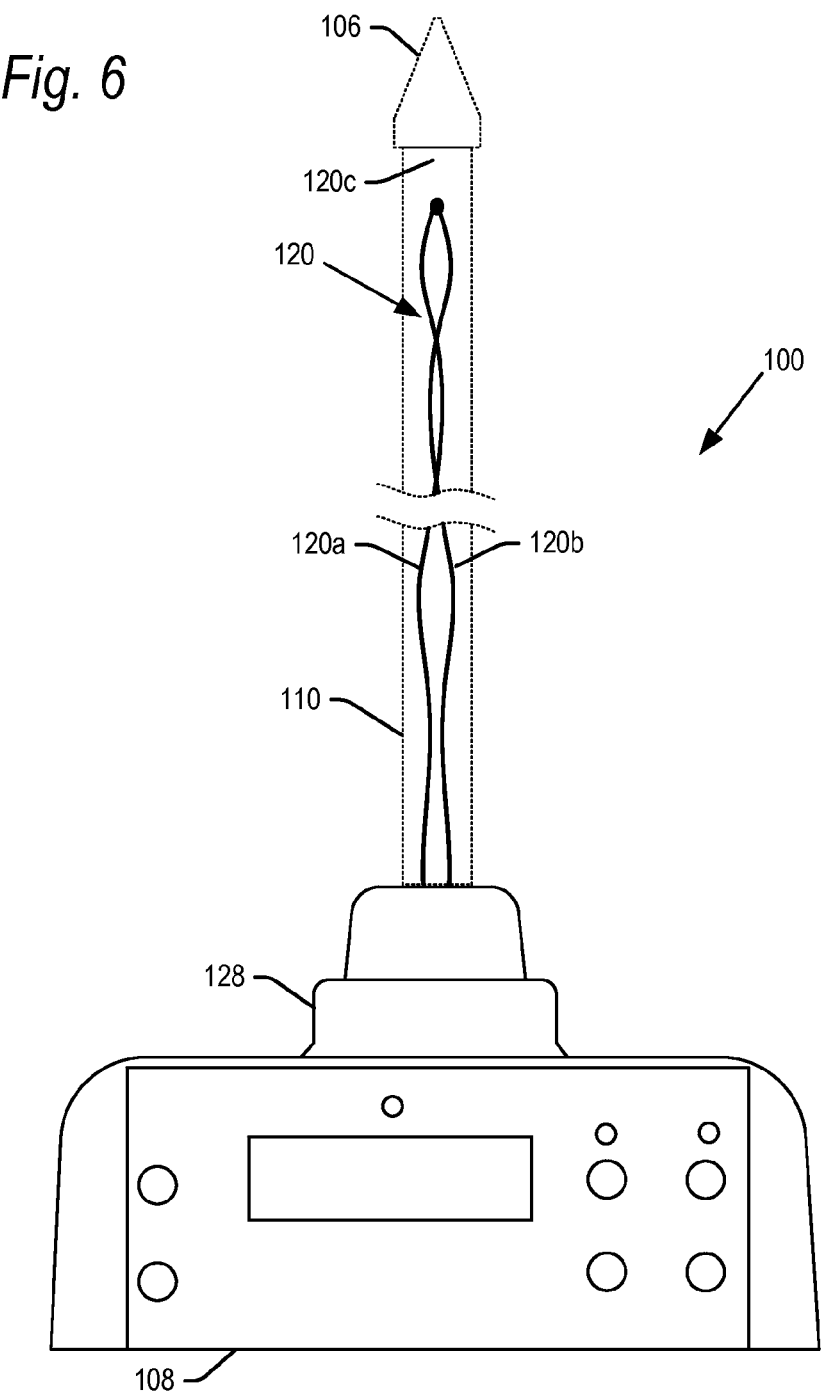

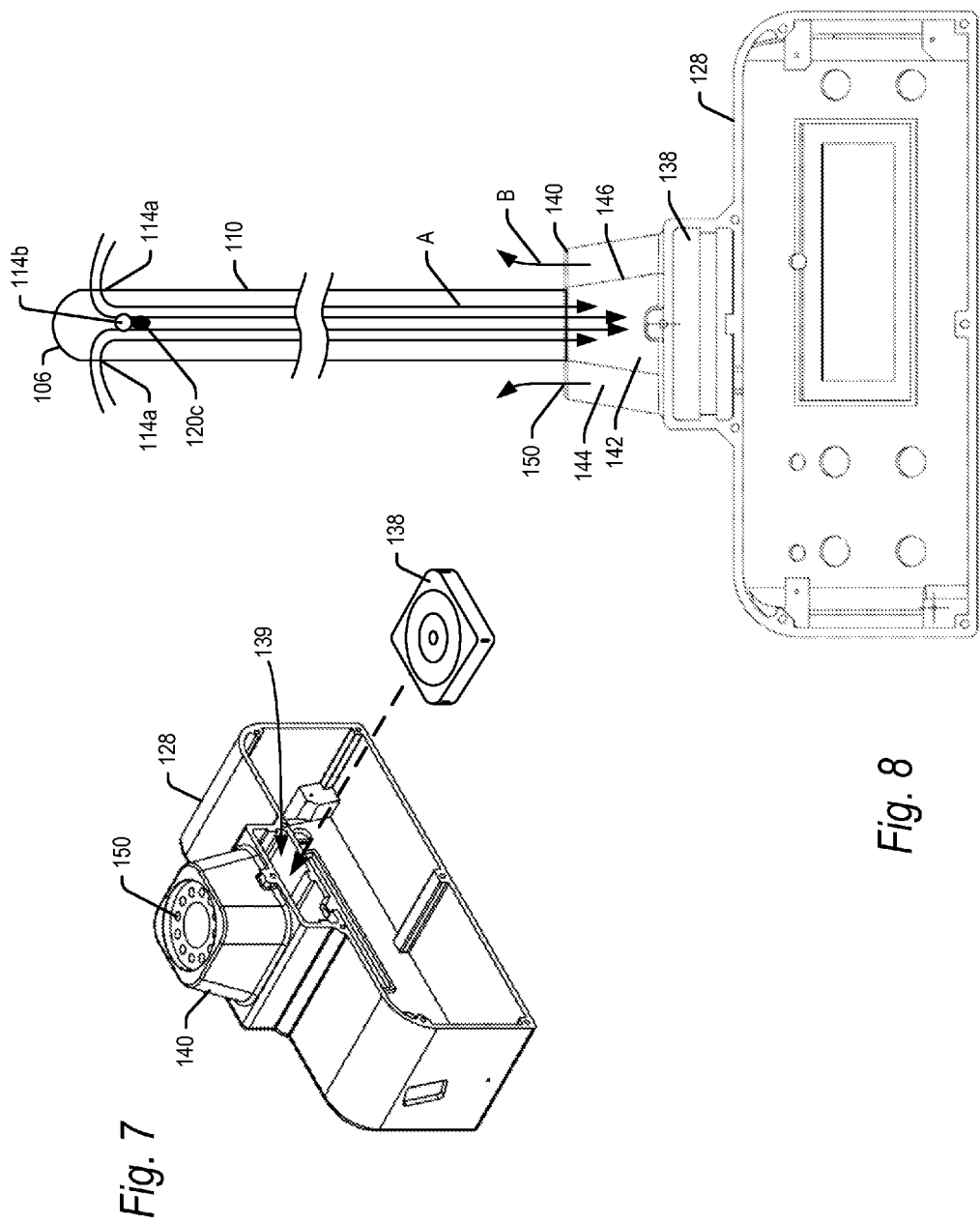

CONTAINER TEMPERATURE MONITORING SYSTEM

BACKGROUND

When transporting temperature controlled items such as fruits and vegetables, it is typically important to their quality and safety to maintain a cold chain from harvest, through the distribution chain to the final customer. This process often includes measuring the temperature of the food items within containers at points along the distribution chain. If for example the measured temperature of a food item lot is above a predefined refrigeration temperature, a distributor may refuse to accept the food item lot.

Fruits and vegetable temperature is usually measured with a metal thermometer probe inserted into the product. This type of temperature measurement has several drawbacks. Conventional thermometers respond too slowly for accurate measurement. Additionally, conventional thermometers measure temperature of one piece of produce that may not represent the temperature of an entire lot. The temperature probe penetrates the food item, often causing physical damage to the sampled item and exposing an interior of the food item to contaminants. The probe may also transmit human or plant pathogens from one item to another. Moreover, conventional temperature measurement methods cannot be used with food items that are sold in packages that must remain sealed or undamaged.

DESCRIPTION OF THE DRAWINGS

FIG. 4 is a top view of a temperature sensor according to embodiments of the present technology.

FIG. 5 is a side view of a temperature sensor according to embodiments of the present technology.

FIG. 6 is a cross section view through the temperature sensor showing the thermocouple and electrical wires for measuring temperature according to embodiments of the present technology.

FIG. 7 is a perspective view of the proximal end housing and fan unit according to embodiments of the present technology.

FIG. 8 is a cross-sectional view through a temperature sensor showing the flow of air through the temperature sensor according to embodiments of the present technology.

DETAILED DESCRIPTION

The present technology will now be described with reference to the figures, which in embodiments relates to a temperature sensor for sensing the temperature of products such as food items in a fast and non-destructive manner. The description that follows pertains to a temperature sensor for measuring the temperature of food items such as fruits and vegetables. However, it is understood that the temperature sensor described herein may be used to measure the temperature of temperature controlled items in general, where a temperature controlled item is an item which is stored, transported and/or handled in a controlled temperature environment. Such temperature controlled items include but are not limited to fruits, vegetables, meat, poultry, plants, flowers, chemicals, pharmaceuticals, blood and other body fluids and tissue. Embodiments of the present technology are described herein for measuring the temperature of food items while in containers. These containers may typically be in cold storage, before and/or after transport or handling. However, in further embodiments, the temperature sensor of the present technology may be used to measure temperature of food items while in transport.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower," "vertical" and "horizontal" and "distal" and "proximal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

Figure 1:
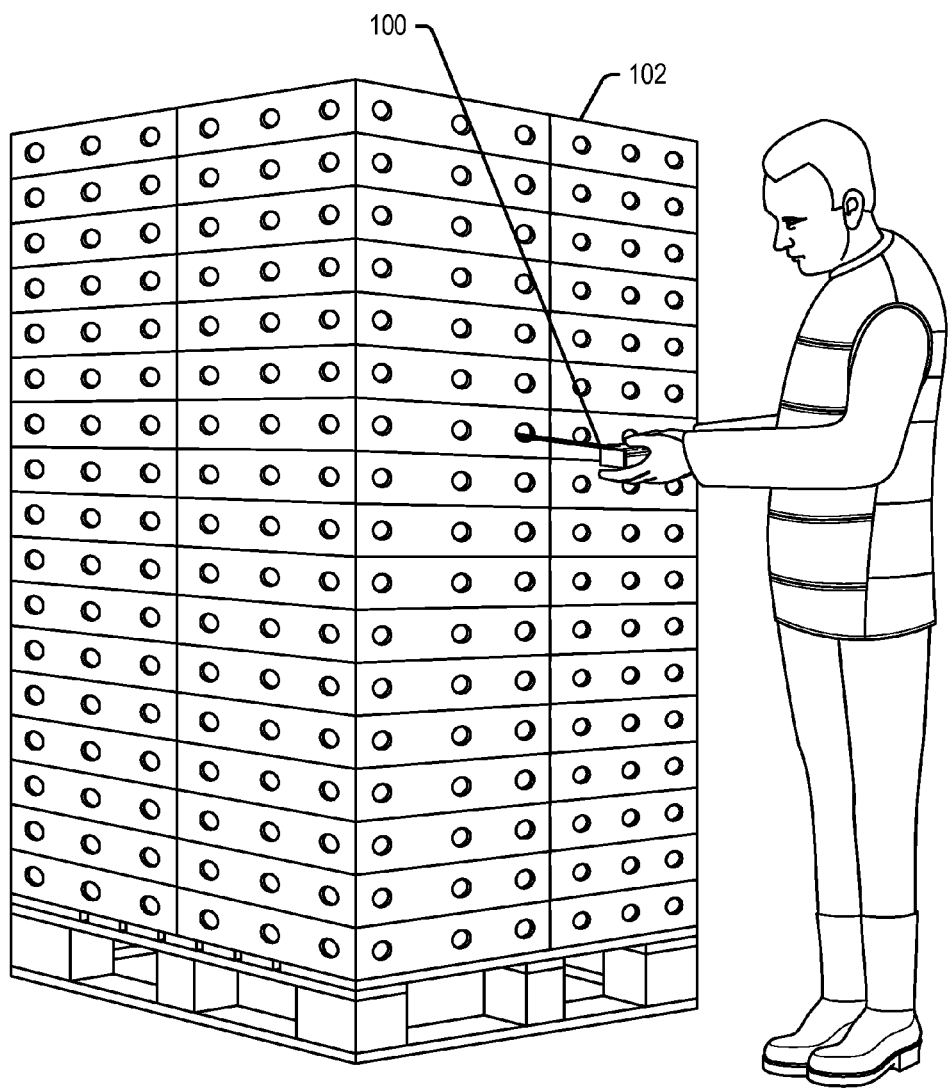
FIG. 1 is a view of a technician testing a container of product such as produce using a temperature sensor according to embodiments of the present technology.

FIG. 1 illustrates a technician using a temperature sensor 100 according to embodiments of the present technology to measure the temperature of product such as food items contained within a container 102. As explained below, the temperature sensor 100 according to the present technology is able to take fast temperature measurements, and in use, the technician may take several different temperature measurements from several different containers 102 to inspect the lot as a whole. Alternatively if containers have air vent openings which align with the air vent openings in neighboring containers, a technician may use sensor 100 to measure the temperature of a food item in a plurality of containers with a single measurement. A container 102 may be any type of enclosure in which products such as food items may be transported or stored, including for example any of various boxes, receptacles, vessels and canisters, as well as pallets of such enclosures. As noted, the temperature sensor 100 may also be used to measure temperatures of products such as food items that are not stored in containers. A few such examples would be the measurement of food items stored in a refrigerated reefer, refrigerated storage room or refrigerated appliance.

Figure 2:
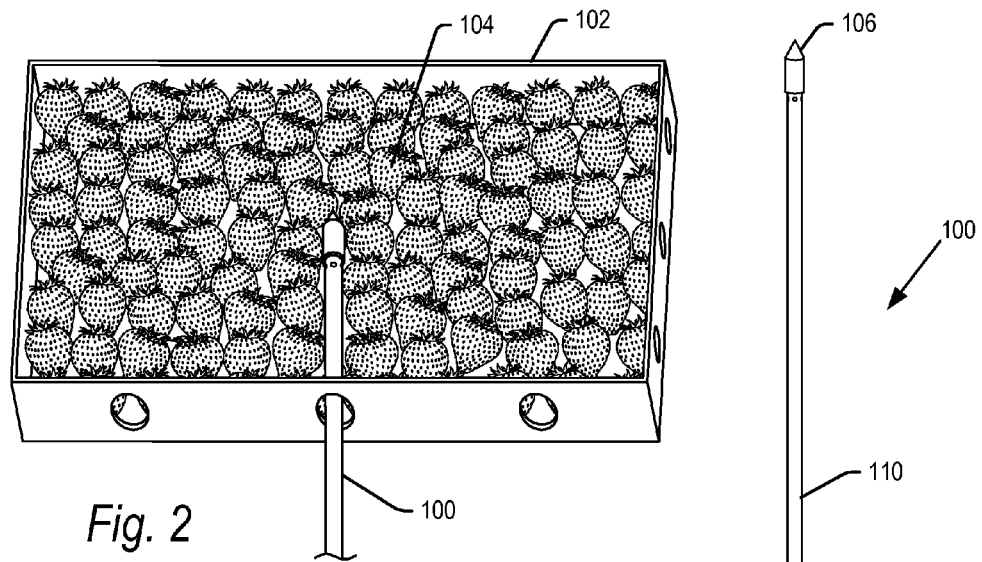
FIG. 2 is a top view of a temperature sensor measuring temperature of a product within a container according to embodiments of the present technology.

As shown in FIGS. 1 and 2, the temperature sensor 100 may be inserted into the container 102 to measure the temperature of food items 104 within the container 102. The food items 104 shown are strawberries, but as noted, the temperature sensor 100 may operate with a wide variety of other food items and other products in general. It has been determined that over time, the temperature of air surrounding food items 104 equilibrates with the temperature of the food items 104. Accordingly, the temperature sensor 100 of the present technology measures the temperature of the food items 104 by measuring the temperature of air around the food items 104.

The temperature sensor 100 may include a first end, at times referred to herein as a distal end 106, and a second end opposite the first end, which second end is at times referred to herein as a proximal end 108. In use, the distal end 106 may be inserted into the container 102 and positioned in a space above, below, to the sides and/or in between food items 104 within the container as shown in FIG. 2. As noted, the temperature sensor 100 in accordance with the present technology may quickly measure the temperature of food items 104 without being inserted into the food items. As explained below, temperature sensor 100 may include sensors which assist in the placement of the distal end 106 within a space around food items 104, instead of within the food items 104.

Some containers 102 have spaces through which the distal end 106 may be inserted into the container. Other containers may have no such spaces. The distal end 106 may be provided with a pointed tip for the purpose of penetrating through a wall of the container 102. The pointed tip may be omitted in further embodiments in favor of a rounded or blunted tip on distal end 106.

Figure 3:
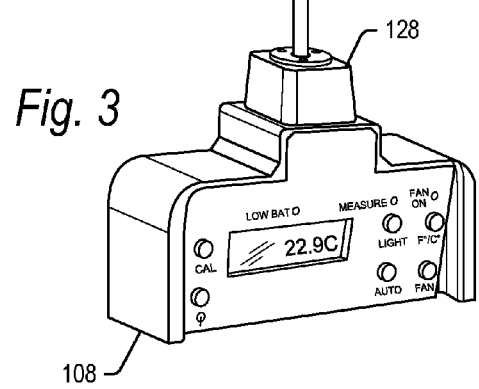
FIG. 3 is a perspective view of a temperature sensor according to embodiments of the present technology.

FIGS. 3-5 are perspective, top and side views of the temperature sensor 100 according to an embodiment of the present technology. The temperature sensor 100 includes a shaft 110 extending generally between the distal end 106 and proximal end 108. The shaft 110 may be a hollow tube, having a length of for example 22 inches, an outer diameter of for example 0.25 inches, and a wall thickness of for example 0.028 inches. The length, outer diameter and wall thickness of shaft 110 may each vary in further embodiments. Shaft 110 may be formed for example of stainless steel, though other materials are contemplated, including for example plastic, fiberglass, polycarbonate and polyvinyl chloride (PVC) tubing. In embodiments, shaft 110 may have a rigid length. However, at least a portion of shaft 110 may be formed so as to flexibly bend, either elastically or plastically. Some materials which may be used to provide a flexible bend include a mesh jacket or helically wound jacket. In further embodiments, the shaft 110 may have telescoping sections enabling the length of shaft to be shortened or lengthened. In such embodiments, the wires of the thermocouple (explained below), may be wound into a coil inside shaft so that they can length and shorten with the shaft 110.

The distal end 106 of the temperature sensor 100 may further include a plurality of air intake holes 114. In embodiments, there may be four intake holes 114, circumferentially spaced 90° from each other around the diameter of the shaft 110. The holes may each have a diameter of 0.062 inches, and may be spaced 0.375 inches from the distal tip. It is understood that the number of intake holes, their spacing from each other and the distal tip, and their diameter may each vary in further embodiments. In further embodiments, there may be three holes, circumferentially spaced 120°, or there may be two holes, circumferentially spaced 180° from each other.

In another embodiment, instead of having four axially aligned holes, a first set of two air intake holes 114 may be at a first axial position along shaft 110, and a second set of two air intake holes 114 may be at a second axial position along shaft 110, axially spaced from the first set. This feature is shown for example in FIG. 8, explained below. In such an example, the first set of holes may be at 0° and 180° around shaft 110, and the second axially spaced set of holes may be at 90° and 270° around shaft 110. Different configurations and orientations of the different sets of air intake holes are contemplated. As explained below, air is drawn into the air intake holes 114 to enable rapid temperature measurement in accordance with aspects of the present technology.

Referring now to the cross-sectional view of FIG. 6, the shaft 110 (shown in phantom in FIG. 6) houses a thermocouple 120 for measuring a temperature of the air at the distal end 106 of the temperature sensor 100. The thermocouple 120 may be type K thermocouple comprised of a first and second wires 120a, 120b of dissimilar materials. Other types of thermocouples may be used, including for example types J, T or E. Wire 120a may for example be copper, while wire 120b may for example be Constantan or other copper-nickel alloys. These materials are by way of example only and may vary in further embodiments. The wires 120a, 120b may be 40 gauge wire, but may have other thicknesses in further embodiments. Having a 40 gauge wire (or finer), in combination with the airflow past the thermocouple 120 as explained below, provides a quick response of the temperature sensor 100 to changes in air temperature. However, as noted above, the wire may be thicker than 40 gauge in further embodiments.

Bare portions of wires 120a and 120b may be joined together at a junction 120c at the distal end 106. The thermocouple 120 measures air temperature at the junction 120c. When there is a temperature change at the junction 120c, the dissimilar metals of wires 120a and 120b generate a voltage which predictably and repeatably correlates to a temperature. The wires 120a, 120b of thermocouple 120 extend through the shaft 110 and may terminate within a housing 128. The wires 120a and 120b may electrically couple to a control unit 130 within the housing 128 which determines the temperature for a given voltage potential between the wires 120a, 120b as explained below.

The wires 120a and 120b may be shielded along their lengths between junction 120c and the controller unit 130. In one example, the wires 120a, 120b may be individually insulated, for example in PTFE (Polytetrafluoroethylene) sheaths. Sheaths of other materials are contemplated. In further embodiments, the wires 120a, 120b may be insulated from each other together within a single sheath. As explained below, in embodiments, the junction 120c is controllably positioned within the sheath proximate to the air intake holes 114, but not touching sides of the shaft 110. The sheaths may fit snugly within the shaft 110 to position the junction 120c as desired. The thermocouple 120 may measure a temperature over a range of for example −330° F. to +2460° F. This temperature range is by way of example only and may vary in further embodiments.

Figure 9:
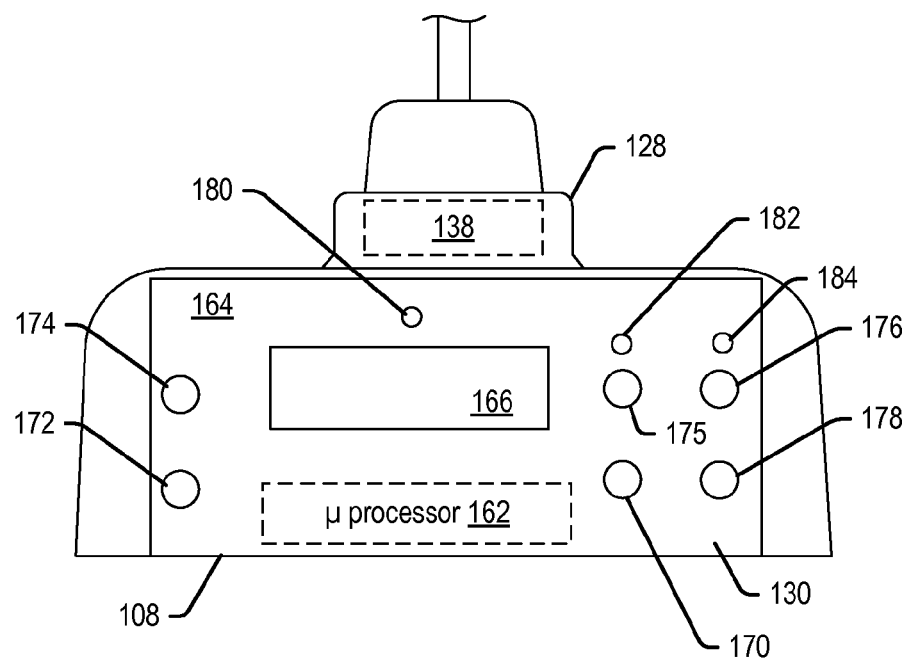
FIG. 9 is a top view of the proximal end of the temperature sensor according to embodiments of the present technology.

As shown in FIGS. 7-9, the housing 128 may include a fan unit 138 seated within a compartment 139 in the housing 128. The housing 128 may further include a housing cap 140 with an intake section 142 separated from an exhaust section 144 by an annular wall 146 (FIG. 8). The shaft 110 may be fixedly mounted to the housing cap 140 at the intake section 142. When the fan unit 138 is powered on, the fan unit 138 draws air into the air intake holes 114, past the junction 120c of the thermocouple 120 (only the junction 120c is shown in FIG. 8 for clarity). The fan unit 138 then draws the air down shaft 110 in the direction of arrows A, and into the intake section 142. The fan unit 138 then pulls air through the fan unit 138 and the air is then exhausted through exhaust holes 150 (FIGS. 7 and 8) at the top of the exhaust section 144.

In examples, the fan unit 138 may be a ball bearing-type fan unit formed of plastic or metal having dimensions of 35 mm long by 35 mm wide by 10 mm deep. These materials and each of these dimensions may vary in further embodiments. The fan unit 138 may include an impeller rotating with an angular velocity of between 5500 RPM and 8500 RPM, though the velocity may vary outside of this range in further embodiments. The fan unit may draw air through the shaft 110 at a rate of 1.34 CFM to 2.12 CFM, though again, the flow rate may vary outside of this range in further embodiments.

In accordance with aspects of the present technology, the configuration and placement of the thermocouple junction 120c, as well as the operation of fan unit 138, advantageously provide rapid response of the temperature sensor 100 to changes in air temperature at the distal end 106. As noted above, using fine gauge wires in the thermocouple 120 allows the thermocouple to be highly responsive to air temperature changes. Additionally, the junction 120c is also configured with a small mass, so that it also enhances the quick response to air temperature changes.

As noted above, the thermocouple 120 may also be provided so that the junction 120c is suspended in the shaft 110 and does not touch the walls of the shaft. This prevents the mass of the shaft 110 from slowing the response of the thermocouple 120.

Moreover, the junction 120c may also be positioned at approximately the same axial positions, or just below the axial positions, of the air intake holes 114 in the shaft 110. For example, FIG. 8 shows two sets of air intake holes 114, including intake holes 114a (left and right on FIG. 8), and intake holes 114b (one seen at the front on FIG. 8). Intake holes 114b may be positioned more proximally along the axis of shaft 110 than the intake holes 114a. The junction 120c is shown axially aligned with a bottom portion (i.e., a portion more proximal than a top portion) of intake holes 114. This causes the air entering the shaft 110 to first contact the junction 120c, before the air temperature is influenced by the temperature of the shaft 110. It is understood that the junction 120c may be positioned at different axial locations relative to the air intake holes 114.

The controller unit 130 for controlling the operation of the temperature sensor 100 will now be explained with reference to the top view of proximal end 108 shown in FIG. 9. The control unit 130 may include a microprocessor 162 (shown schematically in FIG. 9) for controlling the operation of temperature sensor 100, and for converting a voltage potential between wires 120a and 120b to a temperature at the junction 120c. The microprocessor 162 receives user input from, and provides information to, a user interface 164 on a surface of housing 128. User interface 164 includes a display 166 for displaying information to a user including for example a measured temperature. Temperature may be displayed as a whole number, or with one or two decimal places. The display 166 may display a variety of other information, including for example set-up information during calibration, as well as system control information.

The user interface 164 may include an air temperature reading button 170 which toggles the temperature sensor 100 off and on to automatically measure the temperature of food items. When the air temperature reading button 170 is pressed from the off state, the control unit 130 boots up, the fan unit 138 is powered on and the control unit 130 begins receiving initial temperature measurements from the thermocouple 120. Upon initial startup, the display 166 may or may not display initial temperature measurements from thermocouple 120, or may display initial temperature measurements in whole numbers (i.e., without decimal places).

Upon toggling on of the air temperature reading button 170, when two consecutive temperature measurements by the control unit 130 vary from each other by less than some predefined difference, such as for example 0.15° F., the temperature may be displayed on display 166. Alternatively, if initially displayed as a whole number, when consecutive temperatures vary from each other by less than the predefined difference, the temperature may be displayed on display 166 with one or two decimal places.

The present technology may take for example 1 to 3 seconds from when button 170 is initially pushed to measure a temperature of the air around food items. The response time of thermocouple 120 is less than 0.4 seconds, where response time is defined as the time needed for the temperature sensor to reach a temperature equal to 63% of the original difference between the temperature sensor and the sensed medium. This allows the temperature sensor to read product temperature in 1 to 3 seconds.

If the temperature differential between two consecutive readings varies by more than a predefined difference, the display may no longer display the temperature, or may no longer display decimal places. The reading may remain displayed and constant on display 166 for some predetermined period of time, such as for example 2 minutes, or until the button 170 is pressed and toggled off. The reading may also turn off when the manual button 174 is pressed, or if the fan button 178 is pressed (both explained below).

The user interface 164 may for example further include a calibration button 172 for calibrating the thermocouple 120. In general, the calibration process involves placing the distal end 106 of the temperature sensor in an environment of known reference temperature, and then confirming the temperature sensor is calibrated to the reference temperature. In an example, the distal end 106 may be placed in an ice water bath, which has a known temperature of 32° F. With the end 106 in an ice bath, a user may press and hold button 172 for a predetermined length of time, such as for example 3 to 5 seconds, to boot up the control unit 130. At this time, the fan button 148 (explained below) is disabled and the fan unit 138 may remain off. Pressing the calibration button 172 a second time calibrates the current temperature indicated by temperature sensor 100 to the reference temperature, such as for example 32.0° F. in this example. If the display temperature varies more than some limit, such as for example ±5° F. (or less) from the reference temperature, the control unit 130 may display an error warning message on the display 166.

The user interface 164 may further include a manual power on-off button 174 for manually operating the temperature sensor. In this mode, the operator would decide when to operate the fan and when the temperature had stabilized to an acceptable range. When the manual power on-off button 174 is pressed from the off state, the control unit 130 boots up, and the control unit 130 begins receiving initial temperature measurements from the thermocouple 120. In embodiments, the fan unit 138 may remain off during startup upon actuation of button 174. The user may thereafter manually activate the fan unit 138 by pressing the fan button 178. Upon initial startup, the display 166 may or may not display initial temperature measurements from thermocouple 120, or may display initial temperature measurements in whole numbers (i.e., without decimal places).

When two consecutive temperature measurements by the control unit 130 vary from each other by less than some predefined difference, such as for example 0.15° F., the temperature may be displayed on display 166. Alternatively, if initially displayed as a whole number, when consecutive temperatures vary from each other by less than the predefined difference, the temperature may be displayed on display 166 with one or two decimal places. If the temperature differential between two consecutive readings varies by more than a predefined difference, the display may no longer display the temperature, or may no longer display decimal places.

When the manual power on-off button 174 is pressed when the control unit 130 is in the on state, the control unit 130 may turn off. The control unit 130 may also turn off after some predefined length of inactivity, such as for example 5 minutes.

The user interface 164 may further include a back light button 175, which backlights the display for some predetermined period of time, such as for example 5 seconds, and then turns off. The user interface 164 may additionally include a temperature unit button 176 which toggles the displayed temperature between Fahrenheit and Celsius when pressed. The user interface 164 may further include a fan button 178 which turns the fan unit 138 on when pressed.

The positions of buttons 170, 172, 174, 175, 176 and 178 shown on user interface 164 are by way of example, and it is understood that the positions of each of these buttons may vary in further embodiments. Moreover, the above description of the buttons 170, 172, 174, 175, 176 and 178 is by way of example, and one or more of these buttons may be omitted, or other buttons added, in further embodiments.

The user interface 164 may further include LED displays 180, 182 and 184. The LED 180 may for example be a low battery power display which illuminates when battery power drops below some predefined level, such as for example 20% of remaining battery power. LED 182 may flash on and off when and air sample temperature measurement is taking place. Once a steady-state temperature reading has been obtained, LED 182 may remain on for some predefined period of time, such as for example 5 seconds. LED 184 may illuminate while the fan unit 138 is operating. The position of LEDs 180, 182 and 184 on user interface 164 is by way of example only and may vary in further embodiments. Additionally, the indicated use of LEDs 180, 182 and 184 is by way of example, and one or more of these LEDs may be omitted, or other LEDs added, in further embodiments.

In further embodiments, the control unit 134 may include speakers for providing audible tones upon actuation of one or more of the above-described buttons, or upon illumination of one or more of the above-described LEDs.

In further embodiments, the control unit 130 may include hardware and software for wireless communications (e.g., WiFi, Bluetooth, infra-red, or other wireless communication means). In such embodiments, the temperature measured for a food item lot may be wirelessly transmitted to a computing device which is tracking inventory and distribution of food items. Thus, the temperature for a food item lot may be automatically recorded for a given food item lot in a food item tracking system, and the system may automatically accept the food lot or may provide a rejection warning to reject the lot if the measured temperature is not within acceptable predefined limits for the given food item lit.

Figure 10:
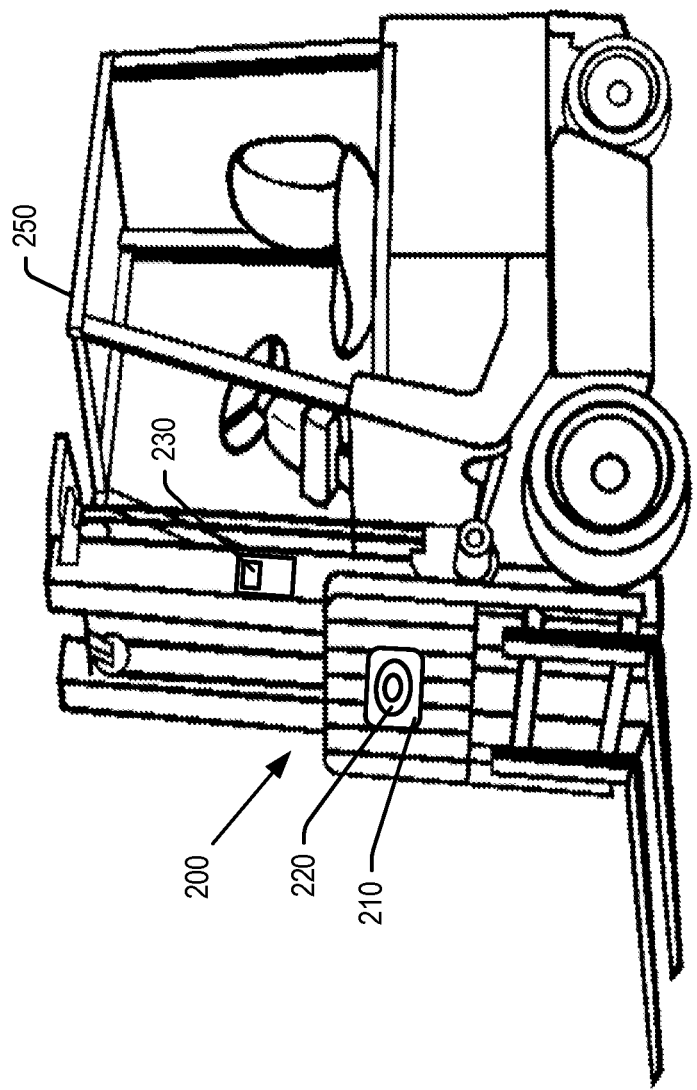
FIG. 10 is a view of an alternative embodiment of the present technology.

Examples of a temperature sensor 100 have been explained above. However, it is understood that a temperature sensor embodying the principles of the present technology may be embodied in other forms. One such further example is shown in FIG. 10. This embodiment relates to a temperature sensor 200 including a pad 210 mounted to the front of a vehicle 250, such as a forklift, which lifts and transports pallets of food items. When the pad 210 contacts the exterior surface of a pallet load of containers, a proximity switch within the pad 210 activates a fan unit that draws air from within the food item container through a central opening in the padded surface. The fan unit (not shown) may be similar to the fan unit 138 described above, and may be provided within the pad 210. Temperature of the food item may be measured with a temperature sensor fixed in the airstream drawn from the pallet load of containers.

The air temperature may be measured with a thermocouple 220 (shown schematically on FIG. 10), which operates in a manner similar to thermocouple 120 described above. Thermocouple 220 may include a junction where wires of dissimilar material are joined to create voltage upon a temperature change at the thermocouple 220.

The voltage is interpreted as a temperature of the intake air by the control unit 230. The temperature of the food item is determined by the control unit and displayed on a digital display on a user interface, as in interface 164 above, which is activated by the proximity switch. The control unit 230 may communicate with the thermocouple 210 through a wireless means. The operator of the vehicle 250 may thus accept or reject the pallet of food items based on the measured temperature. As above, the measured temperature may alternatively or additionally be communicated wirelessly to a remote inventory tracker, which automatically records the temperature in association with the pallet of food items. The control unit 230 may be integrated into the pad 210 together with the thermocouple 220, for example in embodiments where measured temperature is wirelessly transmitted to a remote inventory tracker.

In summary, the present technology relates to a system for monitoring air temperature in a container, comprising: a shaft having a distal end for positioning within the container, and a proximal opposite the distal end, the shaft further including one or more air intake holes adjacent the distal end; a thermocouple mounted within the shaft, the thermocouple having a junction positioned adjacent at least one of the one or more air intake holes; a fan unit for drawing air from the container into the shaft and past the thermocouple junction; and a control unit for measuring a temperature of the air passing the thermocouple junction based on a voltage through the thermocouple.

In another example, the present technology relates to a system for monitoring air temperature in a container of temperature controlled items, comprising: a shaft having a distal end for positioning within the container adjacent and not within the temperature controlled items, and a proximal opposite the distal end, the shaft further sidewalls, the sidewalls including air intake holes adjacent the distal end, the air intake holes comprising a first set of air intake holes spaced a first distance from the distal end along the shaft, and a second set of air intake holes spaced a second distance from the distal end along the shaft, the second distance being greater than the first distance; a thermocouple mounted within the shaft, the thermocouple having a junction positioned adjacent at least one of the air intake holes and spaced from the sidewalls of the shaft; a fan unit for drawing air from the container into the shaft and past the thermocouple junction; and a control unit for measuring a temperature of the air passing the thermocouple junction.

In a further example, the present technology relates to a system for monitoring air temperature in a container of temperature controlled items, comprising: a shaft having a distal end for positioning within the container adjacent and not within the temperature controlled items, and a proximal opposite the distal end, the shaft further including air intake holes adjacent the distal end; a thermocouple mounted within the shaft, the thermocouple having a first and second wires and a junction, the junction positioned adjacent at least one of the one or more air intake holes and spaced from sidewalls of the shaft; a fan unit for drawing air from the container into the shaft and past the thermocouple junction; and a control unit for measuring a temperature of the air passing the thermocouple junction; wherein a thickness of the first and second wires, a mass of the junction, a spacing of the junction from the sidewalls of the shaft, positioning the junction so as to be spaced from the sidewalls and drawing air into the shaft and past the junction enable the system to determine a temperature in the container in between one and three seconds.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A system for monitoring air temperature in a container, comprising:
   a shaft having a distal end for positioning within the container, and a proximal end, opposite the distal end, the shaft further including at least four air intake holes axially aligned around a perimeter of the shaft adjacent to, but not at the distal end;
   a single thermocouple mounted within the shaft, the thermocouple having a junction positioned adjacent the at least four air intake holes;
   a fan unit for drawing air from the container into the shaft and past the thermocouple junction; and
   a control unit for measuring a temperature of the air passing the thermocouple junction based on a voltage through the thermocouple.

2. The system of claim 1, the shaft including a central axis, wherein the at least four air intake holes and the thermocouple junction both residing partially within a plane perpendicular to the central axis.

3. The system of claim 1, wherein the thermocouple junction is at least partially axially aligned with the four air intake holes.

4. The system of claim 1, wherein the thermocouple junction is spaced further from the distal end than the four air intake holes.

5. The system of claim 1, wherein the shaft further includes a second set of at least two air intake holes axially aligned with each other around the shaft and axially spaced further from the distal end than the at least four air intake holes.

6. The system of claim 5, wherein the thermocouple junction is at least partially axially aligned with the second set of at least two air intake holes.

7. The system of claim 5, wherein the thermocouple junction is spaced further from the distal end than the second set of at least two air intake holes.

8. The system of claim 1, the thermocouple comprised of first and second 40 gauge wires.

9. The system of claim 1, the thermocouple junction positioned within the shaft so as to not lie in contact with walls of the shaft.

10. A system for monitoring air temperature in a container of temperature controlled items, comprising:
    a shaft having a distal end for positioning within the container adjacent and not within the temperature controlled items, and a proximal end opposite the distal end, the shaft further having sidewalls, the sidewalls including air intake holes adjacent the distal end, the air intake holes comprising a first set of air intake holes spaced a first distance from the distal end along the shaft, and a second set of air intake holes spaced a second distance from the distal end along the shaft, the second distance being greater than the first distance;
    a thermocouple mounted within the shaft, the thermocouple having a junction positioned adjacent at least one of the air intake holes and spaced from the sidewalls of the shaft, the junction being held in position by structures that are placed downstream to the junction;
    a fan unit for drawing air from the container into the shaft and past the thermocouple junction; and
    a control unit for measuring a temperature of the air passing the thermocouple junction.

11. The system of claim 10, wherein the first set of air intake holes are spaced 180° from each other around the shaft, and wherein the second set of air intake holes are spaced 180° from each other around the shaft.

12. The system of claim 10, wherein the first set of air intake holes are spaced 90° from the second set of air intake holes around the shaft.

13. The system of claim 10, wherein the thermocouple junction is at least partially axially aligned with the second set of air intake holes.

14. The system of claim 10, wherein the thermocouple junction is spaced further from the distal end than the second set of air intake holes.

15. The system of claim 1, the thermocouple comprised of first and second 40 gauge wires.

16. A system for monitoring air temperature in a container of temperature controlled items, comprising:
    a shaft having a distal end for positioning within the container adjacent and not within the temperature controlled items, and a proximal end opposite the distal end, the shaft further including air intake holes adjacent the distal end;
    a thermocouple mounted within the shaft, the thermocouple having a first and second wires and a junction, the junction positioned adjacent at least one of the one or more air intake holes and spaced from sidewalls of the shaft, the junction is further positioned within the shaft to measure a temperature of air drawn past the thermocouple junction before a temperature of the air is affected by a temperature of the shaft;
    a fan unit for drawing air from the container into the shaft and past the thermocouple junction; and
    a control unit for measuring a temperature of the air passing the thermocouple junction;
    wherein a thickness of the first and second wires, a mass of the junction, a spacing of the junction from the sidewalls of the shaft, positioning the junction so as to be spaced from the sidewalls and drawing air into the shaft and past the junction enable the system to determine a temperature in the container in between one and three seconds.

17. The system of claim 16, the thermocouple comprised of first and second 40 gauge wires.

18. The system of claim 16, wherein the system determines a temperature in the container within one second.

\* \* \* \* \*